US012400512B2

(12) United States Patent
Murphy

(10) Patent No.: US 12,400,512 B2
(45) Date of Patent: Aug. 26, 2025

(54) METHOD OF GAMING, A GAMING SYSTEM AND A GAME CONTROLLER

(71) Applicant: Aristocrat Technologies Australia Pty Limited

(72) Inventor: Gesa Murphy, Marrickville (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

(21) Appl. No.: 18/466,674

(22) Filed: Sep. 13, 2023

(65) Prior Publication Data

US 2023/0419770 A1 Dec. 28, 2023

Related U.S. Application Data

(63) Continuation of application No. 17/745,584, filed on May 16, 2022, now Pat. No. 11,798,346, which is a continuation of application No. 16/722,894, filed on Dec. 20, 2019, now Pat. No. 11,335,156, which is a continuation of application No. 15/912,078, filed on Mar. 5, 2018, now Pat. No. 10,573,117, which is a continuation of application No. 15/232,451, filed on Aug. 9, 2016, now abandoned.

(30) Foreign Application Priority Data

Aug. 10, 2015 (AU) ................................ 2015903191

(51) Int. Cl.
*G07F 17/32* (2006.01)

(52) U.S. Cl.
CPC ...... *G07F 17/3211* (2013.01); *G07F 17/3204* (2013.01); *G07F 17/3209* (2013.01); *G07F 17/3223* (2013.01); *G07F 17/3225* (2013.01); *G07F 17/3246* (2013.01); *G07F 17/3251* (2013.01); *G07F 17/3267* (2013.01)

(58) Field of Classification Search
None
See application file for complete search history.

(56) References Cited

U.S. PATENT DOCUMENTS 6,234,897 B1 * 5/2001 Frohm ................ G07F 17/3267 463/20
7,252,591 B2 8/2007 Van Asdale
8,096,877 B2 1/2012 Hoffman
8,574,059 B2 11/2013 Rodgers
8,986,102 B2 3/2015 Vandaele
2006/0229122 A1 10/2006 Macke
(Continued)

OTHER PUBLICATIONS

Australian Examination Report No. 1 issued in App. No. AU2022221415, dated Sep. 1, 2023, 3 pages.
(Continued)

*Primary Examiner* — Damon J Pierce
(74) *Attorney, Agent, or Firm* — Armstrong Teasdale LLP

(57) ABSTRACT

Systems and methods of gaming are disclosed herein. An example method includes receiving a credit wager to initiate play of a base game. The method also includes designating a first symbol display position on the display, selecting a first symbol from a symbol set for display at the first symbol display position, evaluating whether the first symbol is an award symbol, and controlling the display to display a secondary game in response to a determination that the first symbol is an award symbol.

20 Claims, 10 Drawing Sheets

(56) References Cited

U.S. PATENT DOCUMENTS

| | | | | |
|---|---|---|---|---|
| 2008/0064487 | A1 | 3/2008 | Stevens | |
| 2008/0102928 | A1 | 5/2008 | Daley | |
| 2008/0108411 | A1 | 5/2008 | Jensen | |
| 2009/0124347 | A1 | 5/2009 | Rodgers | |
| 2009/0156293 | A1 | 6/2009 | Inamura | |
| 2009/0197667 | A1 | 8/2009 | Kim | |
| 2010/0016061 | A1 | 1/2010 | Gomez | |
| 2010/0120486 | A1 | 5/2010 | Dewaal | |
| 2010/0234092 | A1 | 9/2010 | Gomez | |
| 2011/0105218 | A1* | 5/2011 | Anderson | G07F 17/32 463/20 |
| 2011/0151961 | A1 | 6/2011 | Stevens | |
| 2012/0083327 | A1 | 4/2012 | Zobel | |
| 2013/0260863 | A1 | 10/2013 | Lee | |
| 2013/0331173 | A1 | 12/2013 | Jaffe | |
| 2014/0031100 | A1 | 1/2014 | Gomez | |
| 2014/0057698 | A1 | 2/2014 | Rodgers | |
| 2014/0066174 | A1 | 3/2014 | Rodgers | |
| 2014/0087822 | A1 | 3/2014 | Watkins | |
| 2014/0162751 | A1 | 6/2014 | Ryan | |
| 2014/0179398 | A1 | 6/2014 | Vandaele | |
| 2014/0248939 | A1 | 9/2014 | Kroon | |
| 2014/0256409 | A1 | 9/2014 | Wood | |
| 2014/0256411 | A1 | 9/2014 | Basallo | |
| 2014/0274288 | A1 | 9/2014 | Hornik | |
| 2014/0274294 | A1 | 9/2014 | Baerlocher | |
| 2015/0080096 | A1 | 3/2015 | Saunders | |

OTHER PUBLICATIONS

Office Action dated Feb. 25, 2021 for U.S. Appl. No. 16/722,859 (pp. 1-9).

Office Action dated Mar. 1, 2021 for U.S. Appl. No. 16/722,885 (pp. 1-11).

Office Action dated Feb. 26, 2021 for U.S. Appl. No. 16/722,894 (pp. 1-10).

Office Action (Final Rejection) dated Jul. 30, 2021 for U.S. Appl. No. 16/722,894 (pp. 1-9).

Office Action (Final Rejection) dated Aug. 5, 2021 for U.S. Appl. No. 16/722,885 (pp. 1-8).

Office Action (Notice of Allowance and Fees Due (PTOL-85)) dated Sep. 15, 2021 for U.S. Appl. No. 16/722,885 (pp. 1-7).

Office Action (Notice of Allowance and Fees Due (PTOL-85)) dated Dec. 15, 2021 for U.S. Appl. No. 16/722,859 (pp. 1-7).

Office Action (Notice of Allowance and Fees Due (PTOL-85)) dated Jan. 19, 2022 for U.S. Appl. No. 16/722,894 (pp. 1-7).

Office Action (Non-Final Rejection) dated Feb. 16, 2023 for U.S. Appl. No. 17/745,584 (pp. 1-14).

Office Action (Notice of Allowance and Fees Due (PTOL-85)) dated Jun. 14, 2023 for U.S. Appl. No. 17/745,584 (pp. 1-7).

Office Action (Notice of Allowance and Fees Due (PTOL-85)) dated Sep. 15, 2023 for U.S. Appl. No. 17/745,584 (pp. 1-2).

Australian Examination Report No. 2 issued in App. No. AU2022221415, dated Aug. 30, 2023, 3 pages.

Australian Examination Report No. 1 issued in App. No. AU2024216504 dated Jul. 2, 2025 (pp. 1-3).

* cited by examiner

METHOD OF GAMING, A GAMING SYSTEM AND A GAME CONTROLLER

CROSS-REFERENCE TO RELATED APPLICATIONS

This application is a continuation of and claims priority to U.S. patent application Ser. No. 17/745,584, filed May 16, 2022, which is a continuation of U.S. patent application Ser. No. 16/722,894, now U.S. Pat. No. 11,335,156, filed Dec. 20, 2019, which is a continuation of U.S. patent application Ser. No. 15/912,078, now U.S. Pat. No. 10,573,117, filed Mar. 5, 2018, which is a continuation of U.S. patent application Ser. No. 15/232,451, filed Aug. 9, 2016, which claims priority to Australian Provisional Patent Application No. 2015903191, filed Aug. 10, 2015, all of which are hereby incorporated by reference in their entireties.

BACKGROUND

The present invention relates to a method of gaming, a gaming system, a gaming server and a game controller.

Gaming systems are known, such as spinning reel or "slot" gaming machines, in which various symbols are selected for display and evaluated to determine whether an award is to be made to a player.

While such gaming systems provide players with enjoyment, a need exists for alternative gaming systems in order to maintain or increase player enjoyment.

SUMMARY

Systems and methods of electronic gaming are disclosed. In various embodiments, a gaming system may include an electronic gaming machine, which may comprise a video display configured to display a wagering game, a player input interface configured to receive player input, and a credit input mechanism configured to receive a credit wager. The credit input mechanism may comprise at least one of a card reader, a ticket reader, a bill acceptor, and a coin input mechanism. A base game may be initiated in response to receiving the credit input wager. The gaming machine may further include a game controller, which may be configured to designate, as part of the base game, a first symbol display position on the video display, select, as part of the base game, a first symbol from a symbol set for display at the first symbol display position, evaluate whether the first symbol is an award symbol, and control the video display to display a secondary game in response to a determination the first symbol is an award symbol.

A gaming system may further include a gaming server. The gaming server may be configured communicate with a client device and may comprise a game controller. The game controller may be configured to designate a first symbol display position on a video display of the client device, select a first symbol from a symbol set for display at the first symbol display position, evaluate whether the first symbol is an award symbol, and control the video display of the client device to display a secondary game in response to a determination the first symbol is an award symbol.

An example method includes receiving a credit wager to initiate play of a base game. The method also includes designating a first symbol display position on the display, selecting a first symbol from a symbol set for display at the first symbol display position, evaluating whether the first symbol is an award symbol, and controlling the display to display a secondary game in response to a determination that the first symbol is an award symbol. In one aspect, an electronic gaming machine is disclosed. The electronic gaming machine may comprise a video display and a game controller. The game controller may designate a first display position on the video display, select a first symbol from a symbol set for display at the first display position, evaluate whether the first symbol is an award symbol, and control the video display to display an award game based in response to the first symbol being an award symbol.

BRIEF DESCRIPTION OF THE DRAWINGS

An exemplary embodiment of the invention will now be described with reference to the accompanying drawings in which.

DETAILED DESCRIPTION

Figure 1:
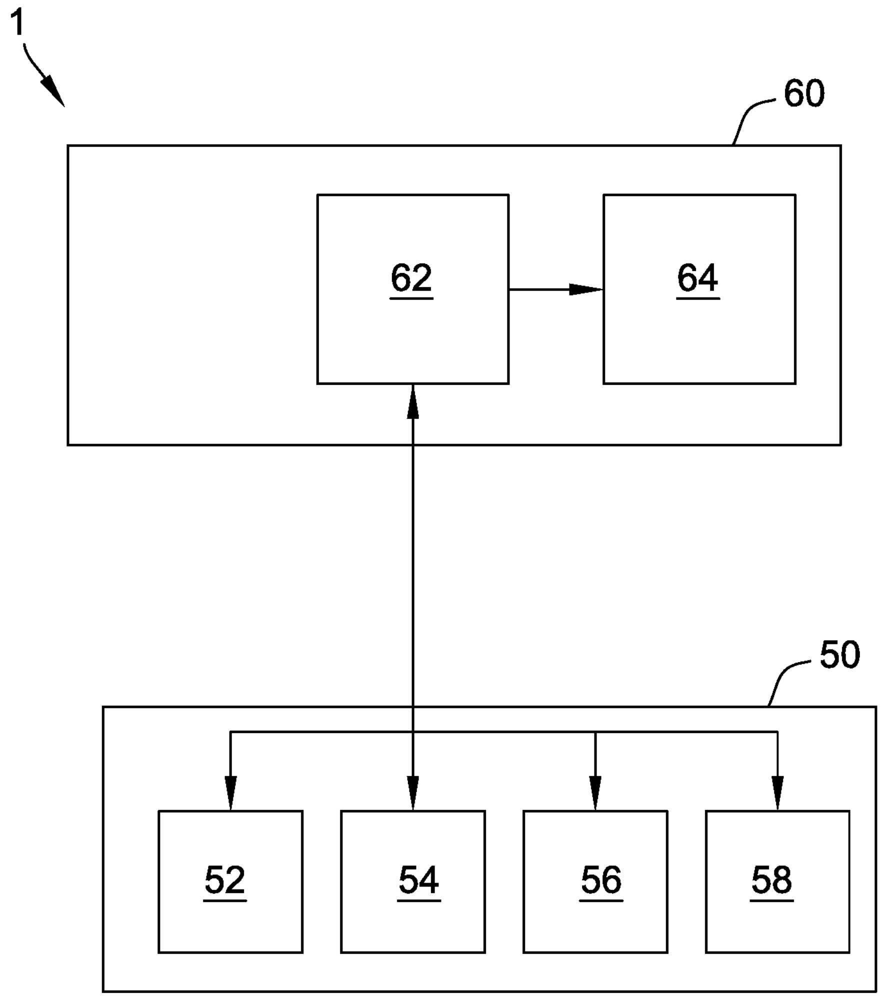
FIG. 1 is a block diagram of exemplary core components of a gaming system.

Referring to the drawings, there is shown an electronic gaming system that includes a plurality of symbols occupying a plurality of symbol display positions. Each symbol display position is disposed within a symbol display. Symbol display positions may be evaluated to determine whether a symbol lock event should be triggered. When a symbol lock event is triggered, the electronic gaming system identifies symbols that contribute to (or form) at least part of an award configuration. Symbols contributing to the award configuration may be "locked" or kept in place on the symbol display for use with a subsequent game (and/or one or more secondary or bonus games).

More particularly, during subsequent games, remaining symbols (e.g., symbols which have not been locked) may be modified and/or evaluated as part of an award determination.

General Construction of an Exemplary Gaming System

The gaming system may assume a number of different forms and/or aspects. In a first aspect, a standalone gaming machine is provided in which all or most components required for implementing the game are present in a player operable gaming machine.

In a second aspect, a distributed architecture is provided wherein at least some of the components required for implementing the game are present in a player operable gaming machine and at least some of the components required for implementing the game are located remotely from the gaming machine. For example, a "thick client"

architecture may be used wherein part of the game is executed on a player operable gaming machine and part of the game is executed remotely, such as by a gaming server. Alternatively, a "thin client" architecture may be used wherein most of the game is executed remotely from the gaming machine, such as by a gaming server and a player operable gaming machine is used only to display audible and/or visible gaming information to the player and receive gaming inputs from the player. The gaming machine may, in addition, comprise any suitable electronic device, such as a personal computer, a laptop, a mobile phone, a smartphone, a tablet computer, and the like.

However, it will be understood that other arrangements are envisaged. For example, an architecture may be provided wherein a gaming machine is networked to a gaming server and the respective functions of the gaming machine and the gaming server are selectively modifiable. For example, the gaming system may selectively operate in standalone gaming machine mode, "thick client" mode or "thin client" mode depending on several factors, including, for example, the game being played, operating conditions, and/or other factors. Other variations will be apparent to persons skilled in the art.

FIG. 1 is a block diagram of exemplary core components of a gaming system 1. The gaming system 1 may include several core components, such as core components 50 and 60, comprising a player interface 50 and a game controller 60, respectively. Player interface 50 is arranged to enable manual interaction between a player and the gaming system 1 and for this purpose includes various input/output components required for the player to enter instructions to play the game and observe the game outcomes.

Components of player interface 50 may vary from embodiment to embodiment but will typically include at least a credit mechanism 52 to enable a player to input credits and receive payouts, at least one display 54, a game play mechanism 56 including one or more input devices that enable a player to input game play instructions (e.g. to place a wager), and one or more speakers 58.

Game controller 60 is in data communication with player interface 50 and typically includes a processor 62 that processes the game play instructions in accordance with game play rules and outputs game play outcomes to display 54. Typically, the game play rules are stored as program code in a memory 64 but can also be hardwired. As used herein, the term "processor" refers generically to any device that can process game play instructions in accordance with game play rules and may include, for example, a microprocessor, microcontroller, programmable logic device or other computational device, a general purpose computer (e.g. a PC) or a server. That is, a processor 62 may be provided by any suitable logic circuitry for receiving inputs, processing them in accordance with instructions stored in memory 64 and generating outputs (for example on display 54). Such processors are sometimes also referred to as central processing units (CPUs). Most processors are general purpose units, however, it is also know to provide a specific purpose processor using an application specific integrated circuit (ASIC) or a field programmable gate array (FPGA).

Figure 2:
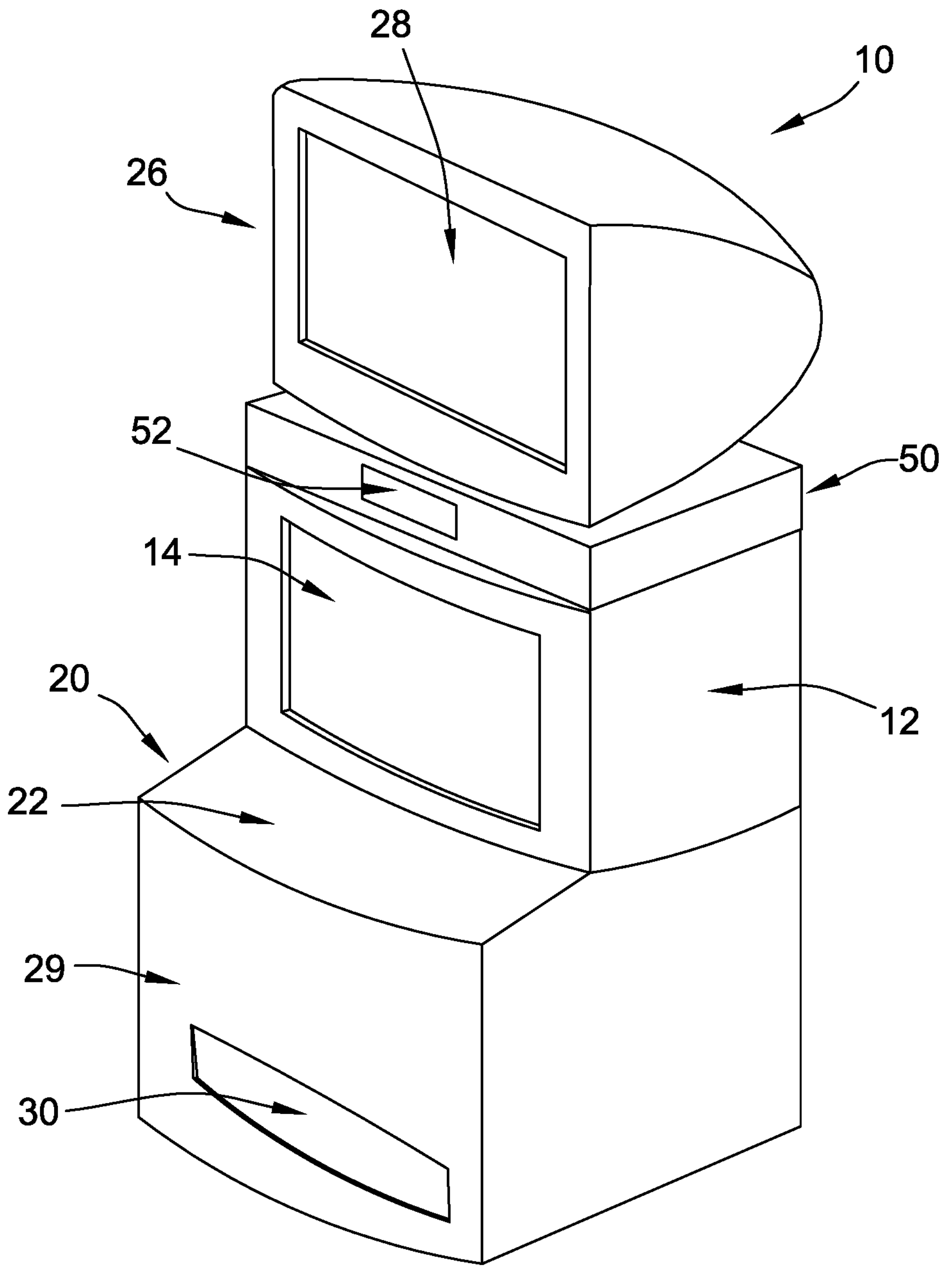
FIG. 2 is a perspective view of an exemplary standalone gaming machine.

FIG. 2 illustrates a gaming system in the form of an exemplary standalone gaming machine 10. In the exemplary embodiments, gaming machine 10 includes a console 12 having a first video display 14. A mid-trim 20 of gaming machine 10 houses a bank of buttons 22 for enabling a player to interact with gaming machine 10, in particular during game play. Video display 14 may also have a touch screen to enable the user to input instructions. Video display 14 may be in the form of a video display unit, particularly a cathode ray tube device. Alternatively, display 14 may be a liquid crystal display, plasma screen, any other suitable video display unit. Top box 26 has a secondary video which may be of the same type as display 14, or of a different type.

As described briefly above, mid-trim 20 may house credit input mechanism 52, such as a coin input chute and a bill collector. Other credit input mechanisms may also be included, such as a player marketing module having a reading or scanning device, a credit card acceptor, a bill or coin acceptor, a ticket printer and/or reader, a ticket in ticket out (TITO) device, and the like. A reading device may, for example, read or scan a player tracking device, such as, for example, as part of a loyalty program. The player tracking device may comprise a card, a flash drive, or any other portable storage medium capable of being read by a reading device. The player marketing module may also allow the player to transfer credits to the gaming machine from credits stored on the player tracking device or from a player account in data communication with the player marketing module. Other embodiments of gaming machines may have a ticket reader for reading tickets having a value and crediting the player based on the face value of the ticket.

Artwork and/or information may be provided on a front panel 29 of the console 12. In the exemplary embodiment, a payout mechanism, such as a coin tray 30 may be mounted beneath front panel 29 for dispensing cash payouts from gaming machine 10.

Figure 3:
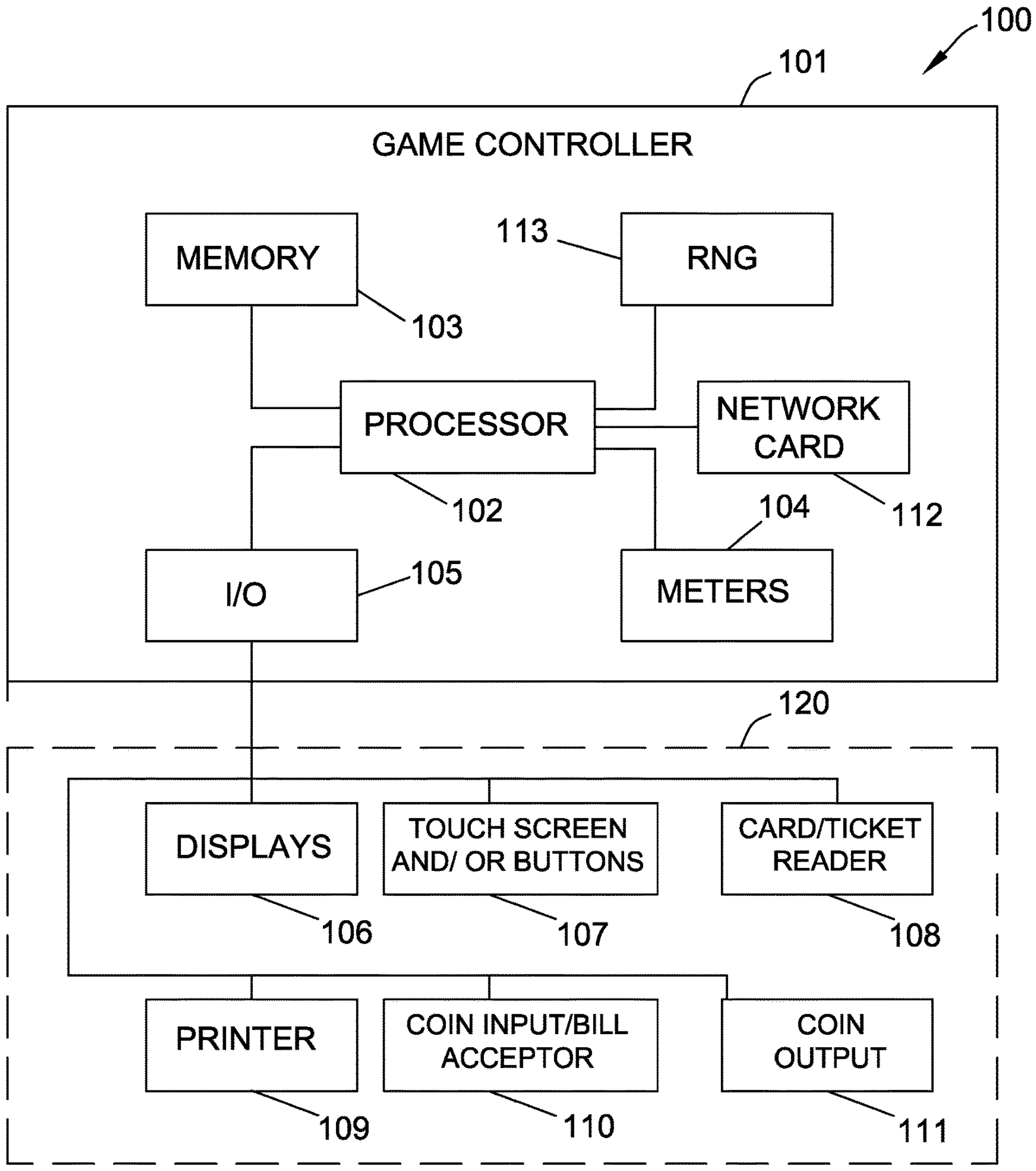
FIG. 3 is a block diagram of exemplary functional components of a gaming machine.

FIG. 3 illustrates a block diagram of exemplary functional components of a typical gaming machine 100 which may be the same as or different from gaming machine 10 (as shown in FIG. 2).

Gaming machine 100 includes a game controller 101 including a processor 102 mounted on a circuit board. Instructions and data to control operation of processor 102 are stored in a memory 103 that is in data communication with processor 102. Typically, gaming machine 100 will include both volatile and non-volatile memory and more than one of each type of memory, with such memories being collectively represented by memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the exemplary embodiment, a player interface 120 includes peripheral devices that communicate with game controller 101 including one or more displays 106, a touch screen and/or input buttons 107 (which provide a game play mechanism), and a credit input mechanism, such as a card and/or ticket reader 108, a printer 109, a bill acceptor and/or coin input mechanism 110, and a coin output mechanism 111. The credit input mechanism is configured to receive a credit wager to initiate play of a base game, and establish a credit balance (e.g., using the received credit wager) that is increasable and decreasable based on wagering activity within a game. Player interface 120 also includes a payout mechanism such as a printer 109 and/or a coin output mechanism 111. The payout mechanism is configured to output a payout to a player of gaming machine 100 based on an outcome of the game (e.g., a base game and/or a feature game). Additional hardware may be included as part of gaming machine 100, or hardware may be omitted as required for the specific implementation. For example, although buttons or touch screens are typically used in gaming machines to allow a player to place a wager and to initiate a play of a game any input device that enables the player to input game play instructions may be used. For example, in some gaming machines a mechanical handle may be used to initiate a play of the game. Persons skilled in the art will also appreciate that a touch screen can be used to emulate other input devices, such as, for example, a touch screen that can display virtual buttons that a player can "press" by touching the screen where they are displayed.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
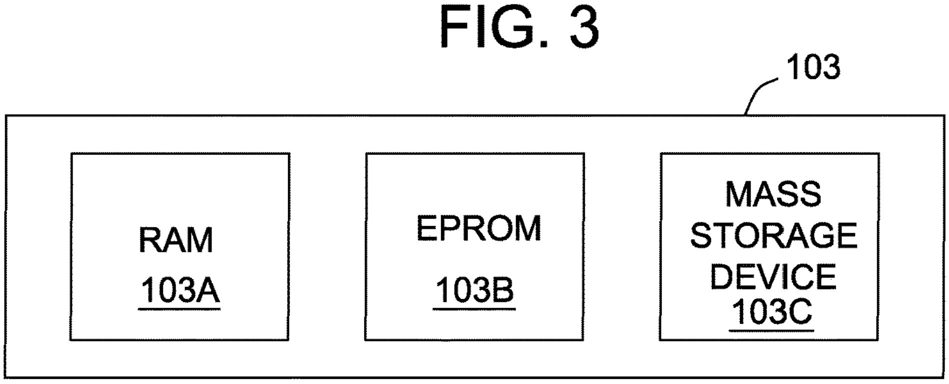
FIG. 4 is a schematic diagram of exemplary functional components of a memory.

FIG. 4 is a block diagram of the main components of a memory 103. In the exemplary embodiment, memory 103 includes RAM 103A, EPROM 103B, and a mass storage device 103C. RAM 103A typically temporarily holds program files for execution by processor 102 and related data. EPROM 103B may be a boot ROM device and/or may contain some system or game related code. Mass storage device 103C is typically used to store game programs, the integrity of which may be verified and/or authenticated by the processor 102 using protected code from EPROM 103B or elsewhere.

It is also possible for the operative components of the gaming machine 100 to be distributed. For example, in one embodiment, input/output devices 106, 107,108, 109, 110, and 111 may be provided remotely from game controller 101.

Figure 5:
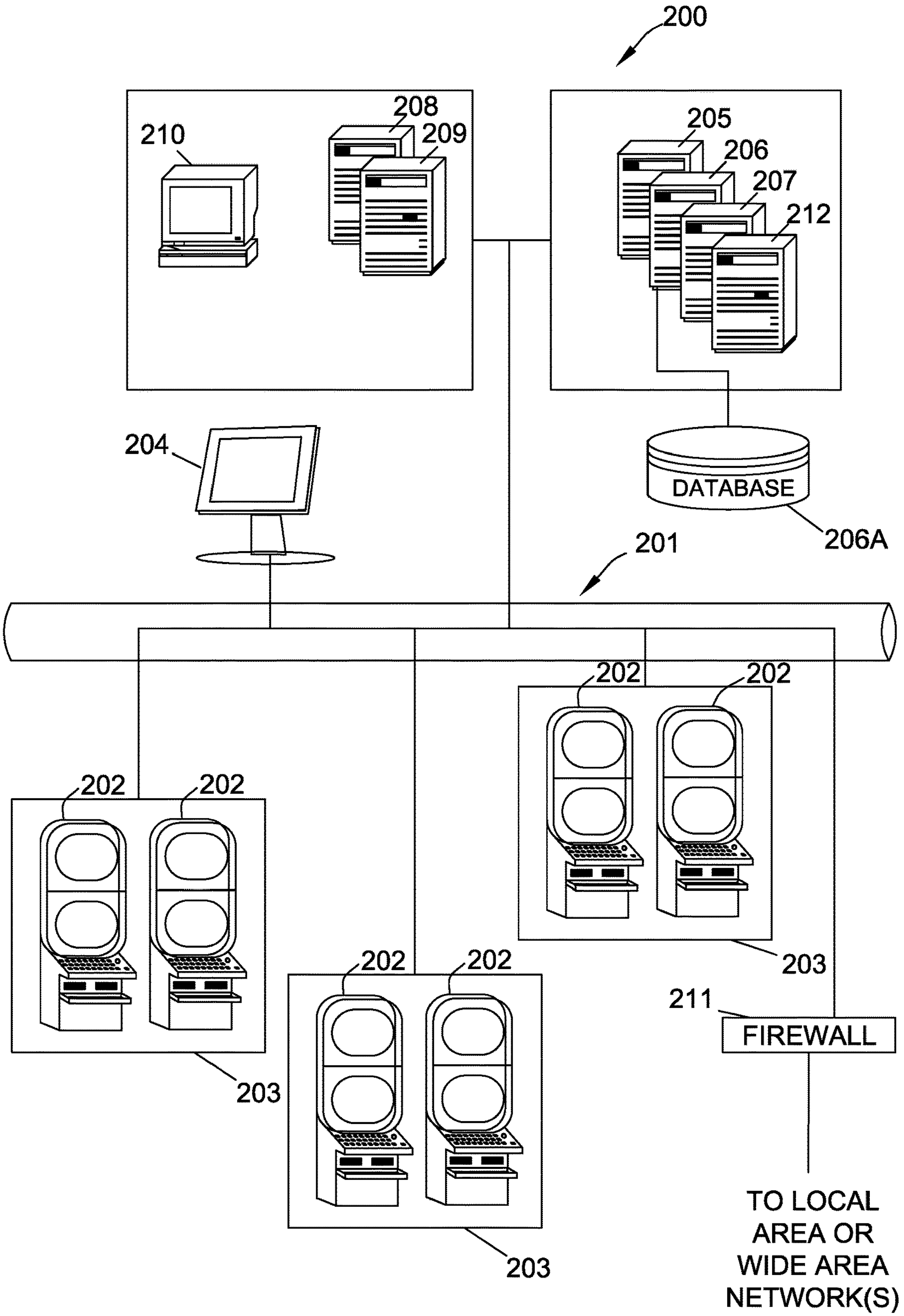
FIG. 5 is a schematic diagram of an exemplary network gaming system.

FIG. 5 illustrates an exemplary gaming system 200 in accordance with an alternative embodiment. Gaming system 200 includes a network 201, which, for example may be a wired or wireless network, such as a Wi-Fi or BLUETOOTH network, an Ethernet network, an RS-232 network, and/or any combination thereof. In the exemplary embodiment, gaming machines 202, shown arranged in three banks 203 of two gaming machines 202, are coupled to network 201. Gaming machines 202 may provide a player operable interface and may be the same as (or substantially similar to) gaming machines 10 and 100 (as shown in FIGS. 2 and 3) or may have simplified functionality, depending, for example, on various game play requirements. Any suitable number of gaming machine banks 203 may be utilized.

One or more displays 204 may also be connected to network 201. For example, displays 204 may be associated with one or more banks 203 of gaming machines. Displays 204 may be used to display representations associated with game play on gaming machines 202 and/or used to display other representations, such as, for example, promotional or informational material.

In a thick client embodiment, game server 205 may implement part of the game played by a player using gaming machine 202, and gaming machine 202 may implement part of the game. In such an embodiment, as both game server 205 and gaming machine 202 implement part of the game, they collectively provide a game controller. A database management server 206 may manage storage of game programs and associated data for downloading or access by various gaming machines 202 in a database, such as database 206A. Typically, if gaming system 200 enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202, and gaming machine 202 essentially provides only the player interface. In such an embodiment, game server 205 provides the game controller. Gaming machine 202 receives player instructions and transmits these instructions to game server 205. In a thin client embodiment, gaming machines 202 may be computer terminals, such as, for example, personal computers running software that provides a player interface. Other client/server configurations are possible, and further details of a client/server architecture can be found in WO 2006/052213 and PCT/SE2006/000559, the disclosures of which are incorporated herein by reference.

Servers are also typically provided to assist in the administration of gaming system 200, including, for example, a gaming floor management server 208 and a licensing server 209 to monitor the use of licenses relating to particular games. An administrator terminal 210 is provided to allow an administrator to run network 201 and the devices connected to network 201.

Gaming system 200 may communicate with other gaming systems, other local networks, for example a corporate network, and/or a wide area network such as the Internet, such as, for example, through a firewall 211.

Persons skilled in the art will appreciate that in accordance with known techniques, functionality at the server side of network 201 may be distributed over a plurality of different computers. For example, elements may be run as a single "engine" on one server or a separate server may be provided. For example, game server 205 could run a random number generator engine. Alternatively, a separate random number generator server could be provided. Further, persons skilled in the art will appreciate that a plurality of game servers could be provided to run different games or a single game server may run a plurality of different games as required by the terminals.

Further Details of the Exemplary Gaming System

In one embodiment, a player may place a wager using game play mechanism 56. A game (or game session) may be initiated in response to placement of the wager, a plurality of symbols randomly drawn, and a game (or game session) outcome determined based upon the symbols drawn. A game outcome may be compared to a pay table (which may be stored in a computer memory) to determine a payout or award (also referred to herein as a win entitlement). Persons skilled in the art will appreciate that a player's win entitlement may vary from game to game depending, for example, on player selections, such as wager amounts. For example, a player's win entitlement may be based a number of winning lines played during a game as well as upon a wager per winning line. Winning lines are typically formed by a combination of consecutive symbol display positions.

In many games, a player's win entitlement may not be governed exclusively by a number of selected lines. For example, in certain embodiments, "scatter" pays may be awarded independent of line selection.

Moreover, in certain aspects, a player may obtain a win entitlement by selecting a number of reels to play and an amount to wager per reel. Such games are marketed under the trade name "Reel Power" by Aristocrat Leisure Industries Pty Ltd., and in such games, the selection of a particular reel may permit substitution of a reel symbol for a symbol at one or more designated display positions. In other words, all symbols displayed at symbol display positions corresponding to a selected reel can be used to form symbol combinations with symbols displayed at a designated, symbol display positions of the other reels. For example, if there are five reels and three symbol display positions for each reel such that the symbol display positions comprise three rows of five symbol display positions, the symbols displayed in the center row may be used for non-selected reels. As a result, the total number of ways to win may be determined by multiplying the number of active display positions of each reel, the active display positions being all display positions of each selected reel and the designated display position of the non-selected reels. In this example, for five reels and fifteen display positions, there are 243 ways to win.

Figure 6:
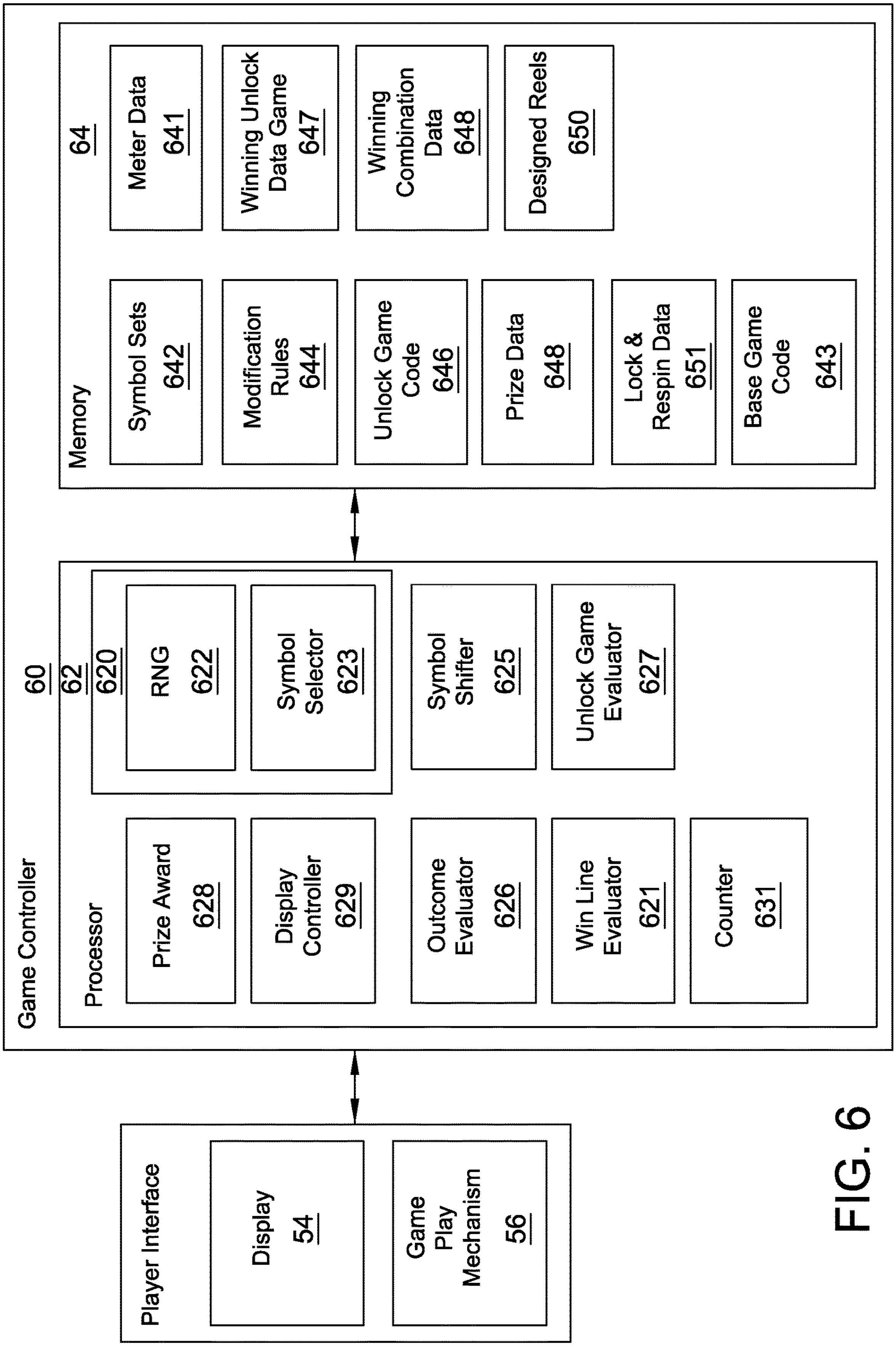
FIG. 6 is a further block diagram of an exemplary gaming system.

FIG. 6 illustrates a block diagram of an exemplary gaming system 1 that includes a plurality of software modules. Processor 62 of game controller 60 of gaming system 1 is shown implementing a number of such modules based on game program code 646 stored in memory 64. Persons skilled in the art will appreciate that various of the modules could be implemented in some other way, such as, for example, by a dedicated circuit.

In an exemplary embodiment, the various software modules may include an outcome generator 620 which may operate in response to the player's operation of game play mechanism 56 to place a wager and, thereby, initiate game play. Thus, as described below, a game outcome may be generated and evaluated.

A game outcome may therefore be generated by symbol selector 623. In particular, symbol selector 623 may select symbols from a set of symbols specified by symbol data 642 using random number generator 622. The selected symbols may, as described herein, fill a symbol display. The selected symbols may be further communicated to display controller 629, which may cause the symbols to be displayed on display 54 at a set of display positions. If wild symbols are to be incorporated into the final symbol display, this may occur, in some embodiments, while the reels are spinning. In other embodiments, this may occur as the reels reach their stop positions. In still other embodiments, this may occur after the reels have been stopped and the initially selected symbols have been displayed. In some embodiments, wild symbols may be added through gameplay and at different times. For example, single wilds and multi-wild symbols may be added as the reels are spinning, and the single wilds stemming from multi-wilds may be added after the reels have been stopped.

In an exemplary embodiment, the symbol display positions of the symbol display may be arranged in a matrix comprising a plurality of columns and a plurality of rows. For example, as described below, the symbol display may be arranged as a rectangular matrix having five columns and four rows. Such an arrangement results in twenty symbol display positions. A plurality of symbol displays (or "windows") may be included with or displayed by video display 54.

The outcome generator 620 may generate one or more game outcomes. All outcomes may be displayed on video display 54 under control of display controller 629. One example of generating a first game outcome is for symbol selector 623 to select symbols for display from symbol data in the form of a plurality of symbol sets 642, where each symbol set may correspond to one of a plurality of reels. The symbol sets specify a sequence of symbols for each reel such that symbol selector 623 can select all of the symbols to be displayed for each reel by selecting a stopping position in the sequence randomly based on a result obtained from random number generator 622. A probability table stored in memory 64 may be referenced to vary the odds of a particular stop position being selected. In addition, other techniques can be used to control the odds of particular outcomes occurring to thereby control the return to player of the game.

In an exemplary embodiment, adjacent symbol display positions may be disposed on independent reels, or adjacent symbol display positions may be common to a particular reel. For example, a column of symbol display positions may be arrayed vertically along a single reel. Such an arrangement of symbol display positions may be referred to herein as a single strip or reel strip.

In an exemplary embodiment, during a game, one or more reels may be locked. As used herein, a "locked" reel may refer to a reel upon which the symbol displayed is held (or not allowed to change) during a subsequent game. In such an embodiment, reels which are not locked may be allowed to spin, and the symbols displayed on unlocked reels may be updated or otherwise allowed to change over the course of multiple games or multiple game sessions. It will be clear to those skilled in the art that when a reel is spun and the symbols displayed thereon updated, the reel may or may not display one or more different symbols depending, for example, on the final position of the reel.

Accordingly, in an exemplary embodiment, processor 62 may execute an unlock game. As described herein, an unlock game may comprise a game, such as a secondary or bonus game, that is independent of any base games being played and/or displayed on display 54. If a player obtains a successful outcome in an unlock game, the player may be provided access to a further game. The further game may be an additional base game or a feature game. Thus, in some embodiments, a successful outcome in the unlock game may provide the player with access to other games or events, such as one or more additional base games (which may result, in turn, in one or more additional unlock games).

An unlock game is therefore an independent game, and a winning outcome of an unlock game may give a player access to additional locked or unlock games, such as one or more additional or unlocked base games. Unlock games may be displayed simultaneously with base games on display 54, and as described herein, a winning result obtained during an unlock game may trigger a win feature, such as, for example, a feature game or an additional base game. A win feature or additional base game may therefore be "unlocked" by the winning result obtained during an unlock game.

Figure 7:
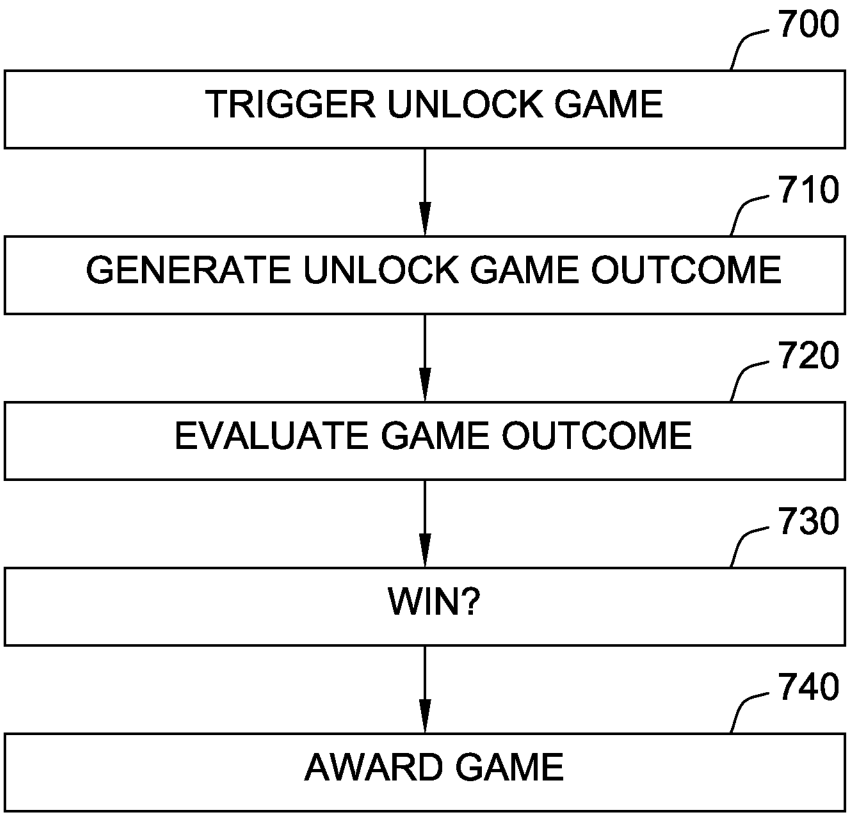
FIG. 7 is a flowchart of an exemplary method of electronic gaming.

With reference to FIG. 7, a flowchart of an exemplary method of electronic gaming is shown. Accordingly, at step 700, an unlock game may be triggered (such as during a base game), and processor 62 may retrieve unlock game code 646 from memory 64. Display controller 629 may designate a position on display 54 for displaying the unlock game. The designated display position may be specified within unlock game code 646, and the unlock game may include displayed symbols. The symbols may be displayed at separate designated symbol display positions on video display 54, and/or one or more symbols may share a display position with the symbol display position for other games being displayed on display 54. In some embodiments the symbol display position for the unlock game may be co-located with one or multiple symbol display positions of other displayed games. In other words, a symbol used as part of an unlock game may be used as part of one or more other games occurring on the gaming system as well.

In response to activation of an unlock game, game generator 620 may generate one or more game outcomes for the unlock game at step 710. In certain embodiments, an unlock game may operate independently of other games displayed on display 54 and controlled by controller 62. The unlock game outcome may be displayed on video display 54 under control of display controller 629. In an exemplary embodiment, symbol selector 623 may select symbols for display at a designated position from unlock symbol set 642. The unlock symbol set may thus specify symbols associated with the unlock game. Symbol selector 623 may, in addition, select an unlock game symbol for display at the designated position based on a result obtained from random number generator 622. A probability table stored in memory 64 may be referenced to vary the odds of a particular stop position being selected. Other techniques can be used to control or vary the odds of particular outcomes and/or to control the return or payout provided to a player.

As described herein, at step 720, outcome evaluator 626 may determine whether one or more selected and displayed symbols relate to, or form, a winning outcome based, for example, on winning unlock game data 647 stored in memory 64.

At steps 730 and 740, and in the event that the unlock game outcome is a winning outcome, a player may be awarded a prize in accordance with winning unlock game prize data 648. The prize, as described herein, may include access to a feature game (such as a secondary or bonus game) and/or access to an additional base game. In further embodiments, the prize may entitle the player to further credits. It will be clear to those skilled in the art that the prize may take different forms depending on the game sequence.

In various exemplary embodiments, an unlock game may be displayed at an one or more symbol display positions on display 54 that are independent from symbol display positions associated with any base games the player is currently playing. Alternatively, and as described elsewhere herein, the unlock game may be co-located (e.g., superimposed over and/or played in tandem with, such as in a particular symbol display window) with display symbols of one or more active base games. The symbols of the unlock game may therefore be superimposed on (or displayed together with) display symbols of base games. For instance, the symbol display position for an unlock game may correspond to the symbol display position for a base game. In various exemplary embodiments, such symbols may be directly overlaid and/or may be of the same or substantially similar size. In various embodiments, however, the size of one or more symbol positions may be different, such as, for example, where an unlock symbol is larger than one or more base game symbols and/or where the symbol position for the unlock game corresponds to multiple symbol positions for the base game.

In an exemplary embodiment, a symbol set of an unlock game may be different from a symbol set of one or more base games displayed on display 54. The symbol set of an unlock game may, for instance, include a designated "unlock" symbol. Such a symbol may identify or correspond to an unlock game or an event occurring as part of a base game which may trigger an unlock game. Alternatively, and in various exemplary embodiments, symbols used in other games may be designated as unlock symbols for the purpose of the unlock game. In some embodiments, the symbol set for the unlock game includes one or more unlock symbols and/or one or more blank symbols.

In various exemplary embodiments, an unlock game may be played concurrently with one or more base games. In such embodiments, the symbol positions for a base game and an unlock game may be generated (or spun) simultaneously. Alternatively, symbol positions for a base game may be spun separately from those of an unlock game. For example, a base game may be executed and symbols selected for display before the unlock game is executed and the unlock game display position spun.

Further, in exemplary embodiments, one or more unlock symbols may be arranged on a reel. A reel may correspond to a predefined or selected sequence of game symbols, such as unlock symbols. In response to execution of an unlock game, random number generator 622 may, in combination with symbol selector 623, determine one or more symbol display positions for one or more reels.

Example Embodiment

An example of an embodiment of the invention is illustrated in FIGS. 8*a*, 8*b* and 8*c*, FIG. 9 and with continuing reference to FIG. 6.

Figure 8A:
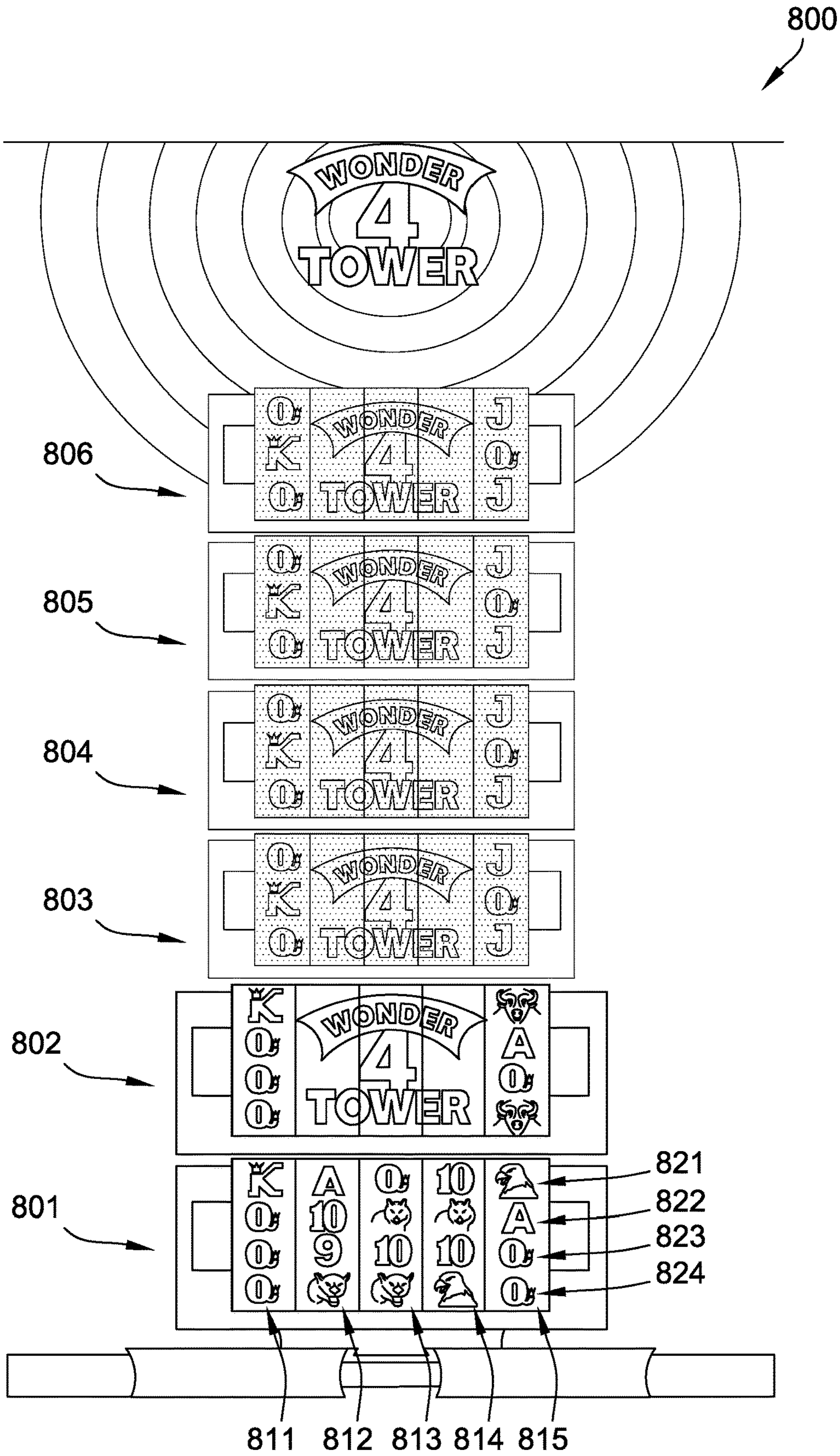
FIG. 8*a* is an illustration of a game in accordance with various embodiments.

Accordingly, FIG. 8*a* illustrates a video display 800, which may be controlled, as described above, by game controller 60. Video display 800 includes six game windows 801, 802, 803, 804, 805, and 806. Each game window 801, 802, 803, 804, 805, and 806 comprises a symbol display and is configured to display a plurality of symbol display positions. These symbol display positions may be arranged, as shown, in a rectangular matrix of five columns and four rows. However, any suitable number of columns and rows is contemplated and within the scope of this disclosure. Game windows 801, 802, 803, 804, 805, and 806 may be active, in which case a game may be displayed, or inactive, in which case a game may not be displayed.

For example, as shown with reference to FIG. 8*a*, game windows 801 802 are active, while game windows 803, 804, 805, and 806 are inactive. A base game defined in base game code 646 is displayed in active game windows 801 and 802. Similarly, an unlock game defined in unlock game code 646 is displayed in active game window 802. The base game includes twenty symbols incorporating symbol display positions from each of the five columns and four rows. The unlock game includes one symbol displayed (or repeated) across the symbol display positions of columns 812, 813, and 814. The symbol associated with the unlock game therefore (and in this instance) spans twelve symbol display positions.

At step 901, outcome generator 620 generates a game outcome for the base games of windows 801 and 802. As described above, the game outcome is determined by random number generator 622 in combination with symbol selector 623 using symbol sets of the base game from the symbol sets memory module 642.

At step 902, outcome generator 620 generates a game outcome for the unlock game of window 802. Again, the game outcome is determined by random number generator 622 in combination with symbol selector 623 using the symbol set of the unlock game from the symbol sets memory module 642.

The game outcomes are generated simultaneously by processor 62. However, as described above, and in various embodiments, one or more game outcomes may be generated at separate times by processor 62. During processing of the game outcomes or for a predetermined time period, display controller 629 may display one or more symbols in various symbol display positions. The symbols may be displayed as animated spinning reels.

More particularly, at step 905, display controller 629 may determine which symbols should be displayed at the display positions of active windows 801 and 802. The unlock game code 646 defines the display requirements for the outcome symbols of the unlock game. The outcome symbols of the unlock game may be displayed superimposed over or in preference to any symbols from other games designated for display at the same symbol display positions.

In addition, at step 905, display controller 629 may determine the display requirements of the base game and unlock game as well as resolve any conflicting display requirements. At step 906, display controller 629 may display the game outcomes in windows 801 and 802.

Window 801 may therefore display a first base game outcome. The outcome includes base game outcome symbols in each of the display positions of columns 811, 812, 813, 814, and 815 and rows 821, 822, 823, and 824. The outcome of the game in window 801 is, in the illustrated embodiment, fully visible to the player.

As shown, however, two games may be played in window 802. These games comprise a second base game and an unlock game. The second base game uses all twenty of the display positions including columns 811, 812, 813, 814, and 815 and rows 831, 832, 833, and 834. The unlock game uses display positions of columns 812, 813, and 814 and rows 831, 832, 833, and 834. Therefore, the unlock game uses twelve of the twenty display positions of window 802. As described above, unlock game code 646 may specify that symbols associated with the unlock game should be displayed in preference to (or superimposed over) any symbols from other games (e.g., base games) designating the same display positions.

Figure 8B:
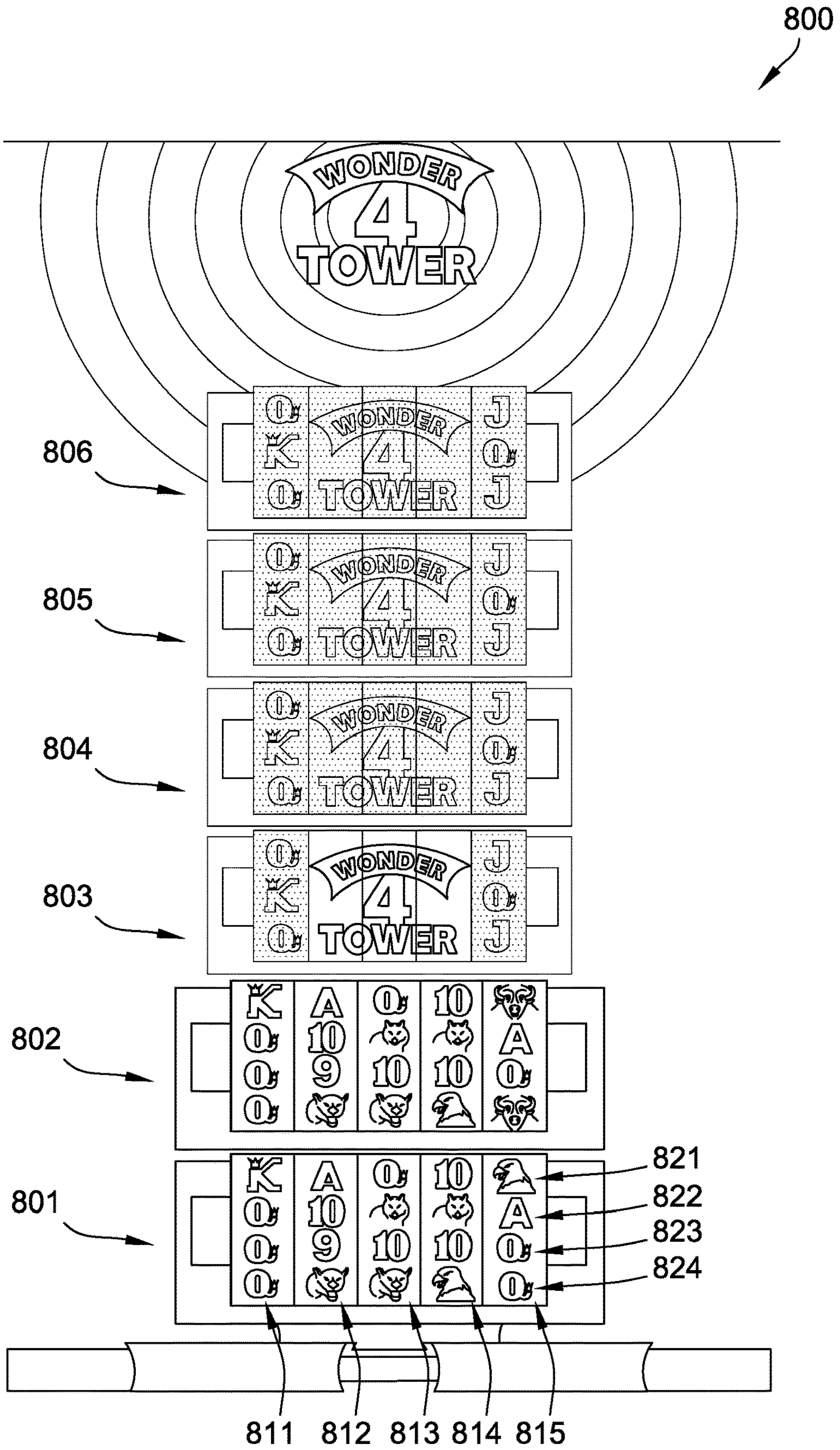
FIG. 8*b* is an illustration of a game in accordance with various embodiments.

At step 907, the outcome of the unlock game is determined and superimposed on the outcome of the base game in columns 812, 813, and 814. As a result (and as illustrated at FIG. 8*b*), window 802 displays base game symbols in the symbol display positions of columns 811 and 815, while columns 812, 813, and 814 display symbols associated with the outcome of the unlock game. In certain embodiments, and as shown at FIG. 8*a*, outcome generator 620 display controller 629 may not to display selected unlock game symbols even where those symbols have been generated and/or selected, as described above.

In addition, and with continuing reference to step 907, unlock game outcome evaluator 627 may retrieve winning combination data for the unlock game from winning combination data memory module 648. As shown at FIG. 8*a*, a winning symbol such as the "Wonder4 Tower" symbol may be selected for display as a winning symbol. In addition, and as described herein, the winning outcome of the unlock game may trigger an unlock event.

In response to an unlock event (e.g., a winning combination of symbols obtained during an unlock game), and with reference to FIG. 8*b*, window 803 may be activated by display controller 629. Display controller 629 may continue to display the outcome of the first base game in window 801, while in window 802, display controller 629 may replace the unlock symbols (e.g., the Wonder4 Tower symbols) with the outcome symbols from the second base game. In window 803, display controller may display one or more symbols to indicate that window 803 is unlocked. In the example of FIG. 8*b*, the unlock symbol is, again, the Wonder4 Tower logo. The unlock symbol may be animated to indicate that the window is unlocked or in the process of being unlocked. The unlocked symbol may be further displayed for a predefined time period. In further embodiments the unlocked symbol may be displayed until a player interacts with the game, such as, for example, until the player provides input to initiate a new game.

Figure 8C:
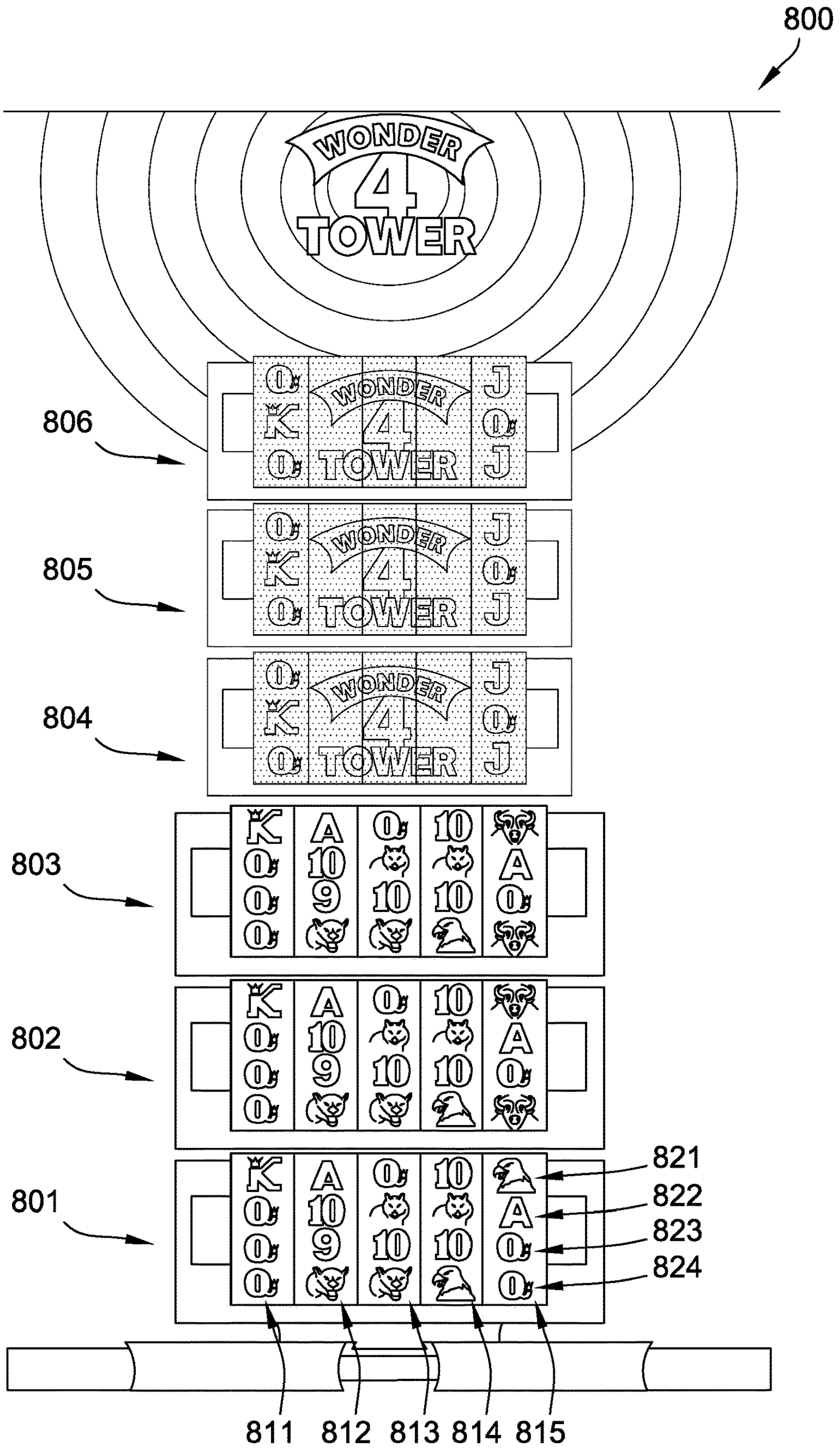
FIG. 8*c* is an illustration of a game in accordance with various embodiments.
Figure 9:
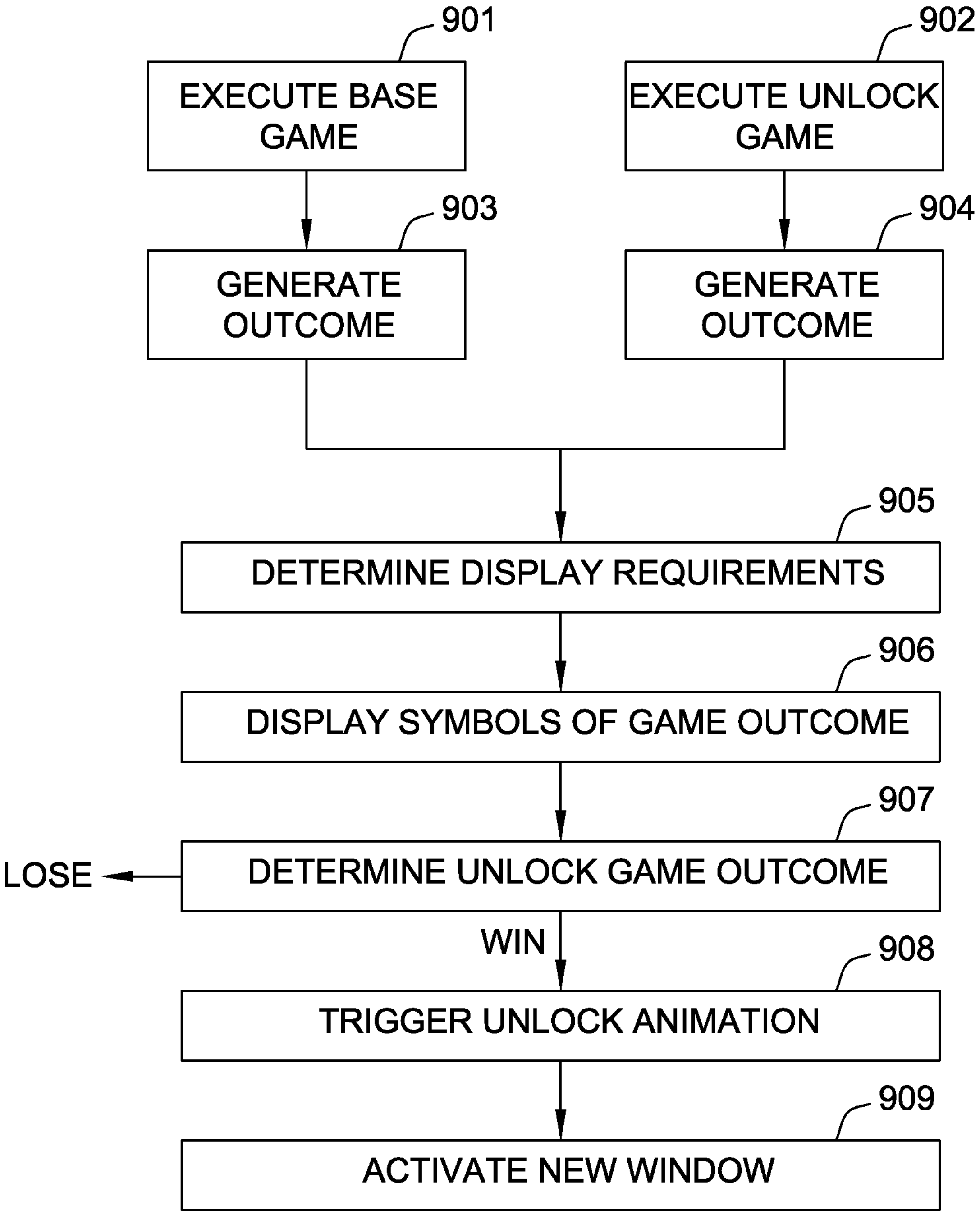
FIG. 9 is a flowchart of an exemplary method of electronic gaming.

As shown with reference to FIG. 8*c*, when the unlocked symbol is removed from window 803 a third base game may be displayed. At this stage, the third base game may comprise the active game.

In further embodiments, unlock games may be triggered at various times during a game sequence (e.g., during a base game sequence). At each unlock game stage, a player may play the base game or the unlock game to unlock the next inactive window until all windows are active. As illustrated at FIGS. 8*a*-8*c*, a plurality of successive base games and unlock games may proceed, during a gaming session, vertically through a plurality of stacked windows (e.g., windows 801-806). Prizes awarded at each tier in the stack may, in addition, increase (or, in certain embodiments, decrease) as a game session proceeds up the stack.

Further, in an exemplary embodiment, the unlock symbol set may include unlock symbols and/or blanks. In the event that the outcome of the unlock game is unsuccessful (e.g., in the event that an unlock game does not unlock a base game at the next tier up) the blank may be displayed, and/or game play may not proceed into windows disposed at levels higher up in the stack.

The animation of the unlock game and base games may be controlled, by display controller 629, to spin different reels at different times. For example, in an exemplary embodiment, display controller 629 may animate the reels of the base game such that the reels appear to spin and/or such that the reels appear to stop at different symbol display positions at different times. The unlock game reel may, in various embodiments, be stopped as the last reel of the base game stops.

Further aspects of the method will be apparent from the above description of the system. It will be appreciated that at least part of the method may be implemented electronically, such as, for example, digitally by a processor executing program code such as in the above description of a game controller. In this respect, insofar as in the above description certain steps are described as being carried out by a processor of a gaming system, it will be appreciated that such steps may require a number of sub-steps to be carried out for the steps to be implemented electronically, such as, for example, due to hardware or programming limitations. For example, to carry out steps such as evaluating, determining, or selecting, a processor may compute several values and/or compare those values.

As indicated above, the method may be embodied in program code. The program code may be supplied in a number of ways, such as, for example, on a tangible, non-transitory, computer readable storage medium, such as a disc or a memory device, e.g., an EEPROM, (for example, that could replace part of memory 103). Further, different parts of the program code may be executed by different devices, such as, for example in a client server relationship. Persons skilled in the art will appreciate that program code provides a series of instructions executable by the processor.

It is to be understood that, if any prior art is referred to herein, such reference does not constitute an admission that the prior art forms a part of the common general knowledge in the art in any country.

In the claims that follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the present disclosure.

What is claimed is:

1. An electronic gaming device comprising:
at least one memory with instructions stored thereon; and
at least one processor in communication with the at least one memory, wherein the instructions, when by the at least one processor, cause the at least one processor to:
cause display of an electronic game including a plurality of game areas, the plurality of game areas including a first game area, a second game area, and a third game area, wherein the second game area and the third game area are displayed as being locked;
present an outcome for a first play of the electronic game, the outcome for the first play associated with a first plurality of symbols at the first game area while the second game area and the third game area are displayed as being locked;
cause display of the second game area to transition from being displayed as locked to being displayed as unlocked based on an unlock condition being satisfied in the outcome for the first play, wherein the second game area being displayed as unlocked includes display of an unlock symbol for one of a predetermined amount of time or until a second play of the electronic game is initiated; and
present an outcome for the second play of the electronic game, the outcome for the second play associated with a second plurality of symbols at the first game area and a third plurality of symbols at the second game area while the third game area remains displayed as being locked.

2. The electronic gaming device of claim 1, wherein the instructions further cause the at least one processor to determine that the unlock condition has been satisfied based on a subset of the first plurality of symbols in the outcome for the first play.

3. The electronic gaming device of claim 2, wherein the subset comprises a plurality of reels in the first game area.

4. The electronic gaming device of claim 1, wherein the instructions further cause the at least one processor to:
determine that the unlock condition has been satisfied based on the outcome for the second play;
unlock the third game area of the plurality of game areas based on the unlock condition being satisfied; and
present an outcome for a third play of the electronic game, the outcome for the third play associated with a fourth plurality of symbols at the first game area, a fifth plurality of symbols at the second game area, and a sixth plurality of symbols at the third game area.

5. The electronic gaming device of claim 1, wherein the instructions further cause the at least one processor to at least one of present the outcome for the first play, determine that the unlock condition has been satisfied, or present the outcome for the second play based on at least one message received from at least one server.

6. The electronic gaming device of claim 1, wherein the instructions further cause the at least one processor to cause display of an animation at the second game area to indicate that the second game area is being unlocked.

7. The electronic gaming device of claim 1, wherein the second game area is associated with a different return to player than the first game area.

8. The electronic gaming device of claim 1, wherein the electronic gaming device is at least one of a computer, a laptop, a mobile phone, a smartphone, or a tablet computer.

9. At least one non-transitory computer-readable storage medium with instructions stored thereon that, in response to execution by at least one processor, cause the at least one processor to:
cause an electronic game including a plurality of game areas to be displayed, the plurality of game areas including a first game area, a second game area, and a third game area, wherein the second game area and the third game area are displayed as being locked;
provide an outcome for a first play of the electronic game, the outcome for the first play associated with a first plurality of symbols at the first game area while the second game area and the third game area are displayed as being locked;
cause the second game area to transition from being displayed as locked to being displayed as unlocked based on an unlock condition being satisfied in the outcome for the first play, wherein the second game area being displayed as unlocked includes display of an unlock symbol for one of a predetermined amount of time or until a second play of the electronic game is initiated; and
provide an outcome for the second play of the electronic game, the outcome for the second play associated with a second plurality of symbols at the first game area and a third plurality of symbols at the second game area while the third game area remains displayed as being locked.

10. The at least one non-transitory computer-readable storage medium of claim 9, wherein the instructions further cause the at least one processor to determine that the unlock condition has been satisfied based on a subset of the first plurality of symbols in the outcome for the first play.

11. The at least one non-transitory computer-readable storage medium of claim 10, wherein the subset comprises a plurality of reels in the first game area.

12. The at least one non-transitory computer-readable storage medium of claim 9, wherein the instructions further cause the at least one processor to:
cause the third game area of the plurality of game areas to be unlocked based on the unlock condition being satisfied in the outcome for the second play; and
provide an outcome for a third play of the electronic game, the outcome for the third play associated with a fourth plurality of symbols at the first game area, a fifth plurality of symbols at the second game area, and a sixth plurality of symbols at the third game area.

13. The at least one non-transitory computer-readable storage medium of claim 9, wherein the instructions further cause the at least one processor to at least one of provide the outcome for the first play or provide the outcome for the second play based on at least one message received from at least one server.

14. The at least one non-transitory computer-readable storage medium of claim 13, wherein the instructions further cause the at least one processor to cause display of an animation at the second game area to indicate that the second game area is being unlocked.

15. The at least one non-transitory computer-readable storage medium of claim 9, wherein the second game area is associated with a different return to player than the first game area.

16. The at least one non-transitory computer-readable storage medium of claim 9, wherein at least one of the at least one non-transitory computer-readable storage medium or the at least one processor are included in one of a computer, a laptop, a mobile phone, a smartphone, or a tablet computer.

17. A method of electronic gaming implemented by at least one processor in communication with at least one memory, the method comprising:

causing an electronic game including a plurality of game areas to be provided, the plurality of game areas including a first game area, a second game area, and a third game area, wherein the second game area and the third game area are displayed as being locked;

determining an outcome for a first play of the electronic game, the outcome for the first play associated with a first plurality of symbols at the first game area while the second game area and the third game area are displayed as being locked;

causing the second game area to transition from being displayed as locked to being displayed as unlocked based on an unlock condition being satisfied in the outcome for the first play, wherein the second game area being displayed as unlocked includes display of an unlock symbol for one of a predetermined amount of time or until a second play of the electronic game is initiated; and determining an outcome for the second play of the electronic game, the outcome for the second play associated with a second plurality of symbols at the first game area and a third plurality of symbols at the second game area while the third game area remains displayed as being locked.

18. The method of claim 17, further comprising:

identifying that the unlock condition has been satisfied based on the outcome for the second play;

causing the third game area of the plurality of game areas to be unlocked based on the unlock condition being satisfied; and determining an outcome for a third play of the electronic game, the outcome for the third play associated with a fourth plurality of symbols at the first game area, a fifth plurality of symbols at the second game area, and a sixth plurality of symbols at the third game area.

19. The method of claim 17, further comprising at least one of determining the outcome for the first play, identifying that the unlock condition has been satisfied, or determining the outcome for the second play based on at least one message received from at least one server.

20. The method of claim 17, wherein at least one of the at least one memory or the at least one processor are included in at least one of a computer, a laptop, a mobile phone, a smartphone, or a tablet computer.

* * * * *